United States Patent [19]

Yu

[11] Patent Number: 5,908,371

[45] Date of Patent: Jun. 1, 1999

[54] HYDRAULIC CONTROL SYSTEM OF AN AUTOMATIC TRANSMISSION WITH HIGH-LOW CONTROL VALVE CONTROLLED BY THREE PRESSURES

[75] Inventor: Pyunghwan Yu, Suwon-si, Rep. of Korea

[73] Assignee: Hyundai Motor Company, Seoul, Rep. of Korea

[21] Appl. No.: 08/919,098

[22] Filed: Aug. 28, 1997

[30] Foreign Application Priority Data

Aug. 30, 1996 [KR] Rep. of Korea ...................... 96-36798

[51] Int. Cl.⁶ .................................................. F16H 61/26
[52] U.S. Cl. .......................... 477/158; 477/130; 477/131; 477/163
[58] Field of Search ..................................... 477/130, 131, 477/158, 163, 61, 156, 159; 475/127

[56] References Cited

U.S. PATENT DOCUMENTS

| | | | |
|---|---|---|---|
| 4,106,369 | 8/1978 | Taga | 477/158 X |
| 5,658,220 | 8/1997 | Jang | 477/130 |
| 5,674,153 | 10/1997 | Jang | 477/158 X |

*Primary Examiner*—Charles A Marmor
*Assistant Examiner*—Ankur Parekh
*Attorney, Agent, or Firm*—Birch, Stewart, Kolasch & Birch, LLP

[57] ABSTRACT

A hydraulic control system for an automatic transmission includes a hydraulic pressure source, a line pressure controller for constantly controlling hydraulic pressure from the hydraulic pressure source, a reducing pressure controller for generating reduced pressure, a damper clutch controller for supplying hydraulic pressure fed from the line pressure controller to a torque converter, a shift controller for converting hydraulic pressure from the line pressure controller into drive pressure corresponding to each speed stage, a hydraulic controller for controlling drive pressure from the shift controller; and a pressure distributer for distributing hydraulic pressure from the hydraulic controller to each friction member for each speed stage by being controlled by drive pressure from the shift controller. The line pressure controller includes a regulator valve controlling hydraulic pressure from the hydraulic pressure source to line pressure and a high-low control valve controlled by reduced pressure from the reducing controller, control pressure from the damper clutch controller, and third speed drive pressure from the shift controller, and supplying second drive pressure from the shift controller to the regulator valve, thereby controlling an operation of the regulator valve together with forward/reverse drive pressure fed from the shift controller to the regulator valve.

5 Claims, 6 Drawing Sheets

HYDRAULIC CONTROL SYSTEM OF AN AUTOMATIC TRANSMISSION WITH HIGH-LOW CONTROL VALVE CONTROLLED BY THREE PRESSURES

BACKGROUND OF THE INVENTION

The present invention relates to a hydraulic control system for an automotive automatic transmission and a line pressure control method.

Generally, a conventional automatic transmission includes a torque convertor, a multi-stage gear shift mechanism connected to the torque convertor, and a hydraulic control system which selects a gear stage of the gear shift mechanism according to a driving state of the vehicle.

The above hydraulic control system includes a regulator valve for regulating line pressure to be in high or low state. The regulator valve is designed so that it regulates line pressure to be in a low state only when a damper clutch is operated in third and fourth speeds. As a result, the ability to achieve low line pressure is limited such that shift efficiency deteriorates.

SUMMARY OF THE PRESENT INVENTION

For the foregoing reason, there is a need for a hydraulic control system of an automotive automatic transmission which can regulate line pressure to be in a low state in a second speed damper clutch operating state and in third and fourth speeds regardless of the operation of the damper clutch, thereby enhancing the shift efficiency.

According to a feature of the present invention, a hydraulic control system for an automatic transmission including a plurality of friction elements associated with respective transmission speeds, the hydraulic control system comprises:

a hydraulic pressure source;

line pressure control means for controlling hydraulic pressure from the hydraulic pressure source to constant line pressure;

reducing pressure control means for generating reduced pressure by reducing hydraulic pressure from the hydraulic pressure source;

damper clutch control means for supplying hydraulic pressure fed from the line pressure control means to a torque converter as damper clutch release or operating pressure by controlling reduced pressure from reducing pressure control means;

shift control means for converting hydraulic pressure from the line pressure control means into drive pressure corresponding to each speed stage;

hydraulic control means for controlling drive pressure from the shift control means by controlling reduced pressure from the reducing control means; and pressure distributing means for distributing hydraulic pressure from the hydraulic control means to each friction member for each speed stage by being controlled by drive pressure from the shift control means;

wherein the line pressure control means comprises:

a regulator valve controlling hydraulic pressure from the hydraulic pressure source to line pressure; and a high-low control valve controlled by reduced pressure from the reducing control means, control pressure from the damper clutch control means, and third speed drive pressure from the shift control means, and supplying second speed drive pressure from the shift control means to the regulator valve, thereby controlling an operation of the regulator valve together with forward/reverse drive pressure fed from the shift control means to the regulator valve.

Preferably, the high-low control valve comprises: a first port for receiving the third speed drive pressure from the shift control means; a second port for receiving the reduced pressure from the reducing control means; a third port for receiving the control pressure from the damper clutch control means; a fourth port for receiving the second speed drive pressure from the shift control means; a fifth port for supplying the second speed drive pressure coming through the fourth port to the regulator valve; and a valve spool for controlling port conversion in accordance with hydraulic pressure fed through the first, second and third ports.

The valve spool comprises a first land on which the third speed drive pressure coming through the first port acts; a second land on which the reduced pressure coming through the second port acts so as to function together with the first land for selectively communicating the second port with the sixth port, the second land having a diameter larger than that of the first land; and a third land on which the control pressure coming through the third port acts for selectively communicating the fourth port with the fifth port and for selectively communicating the fifth port with the sixth port together with the second land.

The damper clutch control means comprises a damper clutch control solenoid valve, the damper clutch control solenoid valve being controlled in a second speed stage such that the control pressure cannot be applied to the high-low control valve, the reduced pressure can be applied to the high-low pressure valve, and the second speed drive pressure can be fed to the regulator valve via the high-low control valve, whereby the regulator valve is controlled by the second speed drive pressure and the forward drive pressure from the manual valve so as to control the line pressure to a low state.

In addition the high-low control valve is constantly controlled by the reduced pressure and the third speed drive pressure in third and fourth speed stages regardless of whether the damper clutch solenoid valve is being controlled to On or Off state such that the second speed drive pressure can be fed to the regulator valve via the high-low control valve, whereby the regulator valve is controlled by the second speed drive pressure and the forward drive pressure from the manual valve so as to control the line pressure to a low state.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

Figure 1:
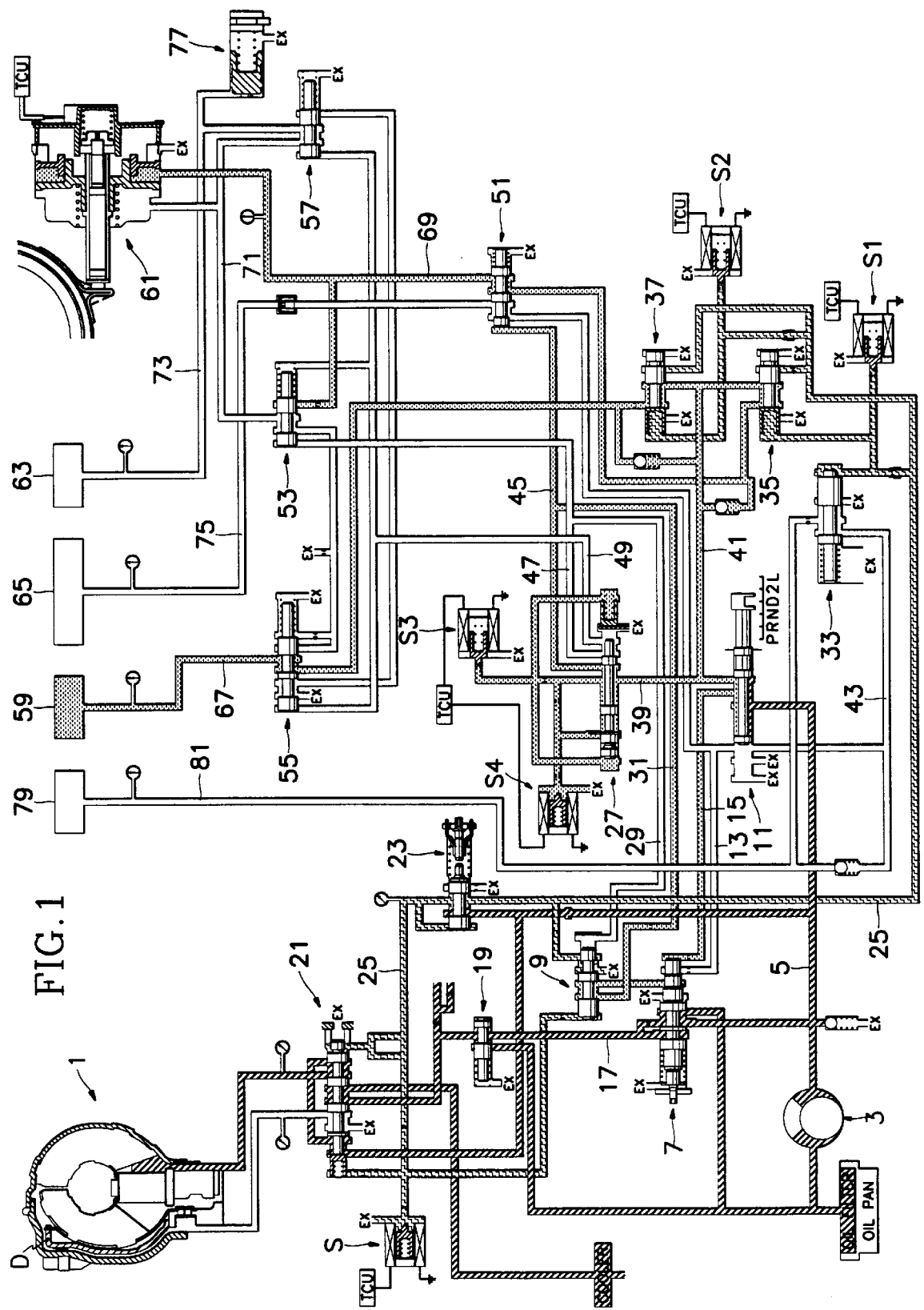
FIG. 1 is a hydraulic circuit diagram showing hydraulic pressure flow when a hydraulic control system according to a preferred embodiment of the present invention is in a second speed stage where a damper clutch is operated.

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "right" and "left" will designate directions in the drawings to which reference is made.

[Control System Components and Their Interconnection]

Referring to FIG. 1, a hydraulic control system of the present invention comprises a hydraulic pump 3 for generating line pressure, a line pressure controller having a regulator valve 7 and a high-low control valve 9, and a shift controller having a manual valve 11. Hydraulic pressure generated from the hydraulic pump 3 is directed to the line pressure controller and the shift controller.

The line pressure directed to the regulator valve 7 is controlled by both control pressure selectively fed from the high-low control valve 9 and forward-reverse drive pressure fed from the manual valve 11 through forward and reverse pressure passages 13 and 15.

Part of the regulated line pressure is directed to a damper clutch control valve 21 via a torque converter control valve 19 connected to the regulator valve 7 through a passage 17. The line pressure directed to the damper clutch control valve 21 is selectively fed to an operating or a non-operating chamber of a damper clutch D of the torque converter 1 in accordance with an operation of the damper clutch control valve 21.

The damper clutch control valve 21 is connected to a reducing valve 23 to be supplied with reduced pressure therefrom through a reducing pressure line 25 such that the damper clutch control valve 21 can control the damper clutch D. The reduced pressure is varied in accordance with an operation of a solenoid valve S which is ON/OFF controlled by a transmission control unit TCU.

The high-low control valve 9 of the line pressure controller is controlled by hydraulic pressure reduced to be lower than the line pressure while passing through the reducing valve 23, third speed pressure fed from the shift control valve 27 through a passage 29, and control pressure controlled in accordance with an operation of a damper clutch control solenoid valve S. The high-low control valve 9 is further connected to the shift control valve 27 through a passage 31 so as to be supplied with second speed pressure and supply the second speed pressure to the regulator valve 7 as control pressure.

As described above, the reducing valve 23 is supplied with line pressure and reduces the line pressure. The hydraulic pressure reduced by the reducing valve 23 is fed to the high-low control valve 9, the damper clutch control valve 21 controlled by the damper clutch control solenoid valve S, and the pressure controller.

The pressure controller supplied with reduced pressure from the reducing valve 23 comprises an N-R control valve 33 and a first pressure control valve 35, both of which are controlled by an operation of a first pressure control solenoid valve S1 which duty-controls the reduced pressure, and a second pressure control valve 37 controlled by an operation of a second pressure control solenoid valve S2 which duty-controls the reduced pressure. The pressure controller is designed such that, when shifting from a neutral "N" range to a drive "D" or a reverse "R" range, it is supplied with drive pressure from the shift controller and supplies the drive pressure to a pressure dispenser as control pressure.

The manual valve 11 feeding drive pressure to the valves 33, 35 and 37 of the pressure controller is designed to change hydraulic pressure fed from the line pressure passage 5 into forward drive pressure and to supply the forward drive pressure to the shift control valve 27 and the first and second pressure control valves 35 and 37 in the neutral "N", drive "D", second "2" and low "L" ranges. That is, the manual valve 11 is connected to the shift control valve 27 through a passage 39 and to the first and second pressure control valves 35 and 37 through a passage 41 branched off from the passage 39. In the reverse "R" range, the manual valve 11 changes line pressure fed from the line pressure passage 5 into reverse drive pressure and supplies the reverse drive pressure to the N-R control valve 33. That is, the manual valve 11 is connected to the N-R control valve 33 through a passage 43.

The shift control valve 27 connected to the manual valve 11 through the passage 39 changes hydraulic pressure into control pressure in accordance with operations of first and second shift control solenoid valves S3 and S4 controlled by the TCU and selectively supplies the control pressure to a 1-2 shift valve 51, a 2-3/4-3 shift valve 53, and 2-4/3-4 shift and end clutch valves 55 and 57 through second, third and fourth speed passages 45, 47 and 49, respectively, thereby controlling the operations of the valves 51, 53, 55 and 57.

The 1-2 shift valve 51, 2-3/4-3 shift valve 53, 2-4/3-4 shift valve 55 each controlled as described above selectively supply hydraulic pressure fed from the first and second control valves 35 and 37 respectively controlled by the first and second pressure control solenoid valves S1 and S2 to first, second, third and fourth friction members 59, 61, 63 and 65 according to speed ratios at each range.

To achieve this, the first friction member 59 is connected to the 2-4/3-4 shift valve 55 through a passage 67, the second friction member 61 to the 1-2 shift valve 51 through a passage 69 and to the 2-3/4-3 shift valve 53 through a passage 71, the third friction member 63 to the end clutch valve 57 through a passage 73, and the fourth friction member 65 to the 1-2 shift valve 51 through a passage 75.

The passage 69 is an operating passage for feeding application pressure to the second friction member 61, while the passage 71 is a release passage for feeding release pressure to the second friction member 61. Mounted in the passage 73 for feeding hydraulic pressure to the third friction member 63 is an accumulator valve 77 for absorbing shock occurring when hydraulic pressure is applied to the third friction member 63 and for preventing hydraulic pressure from being abruptly released from the third friction member 63.

A fifth friction member 79 is directly connected to the N-R control valve 33 through a passage 81 so as to receive hydraulic pressure therefrom.

As described above, the line pressure controller for regulating line pressure directed to either the reducing valve 23 of the reducing pressure controller or the manual valve 11 of the shift controller comprises the regulator valve 7 and the high-low control valve 9.

The regulator valve 7 is controlled by second speed drive pressure selectively fed from the high-low control valve 9 and forward-reverse drive pressure selectively fed from the manual valve 11, thereby controlling line pressure corresponding to each speed stage by controlling the amount of fluid fed from the hydraulic pump 3.

The high-low control valve 9 selectively directing second speed drive pressure to the regulator valve 7 is controlled by reduced pressure fed from the reducing valve 23 through the reducing pressure line 25, control pressure according to the ON/OFF operation of the damper clutch control solenoid valve S, and third speed drive pressure fed from the shift control valve 27.

Figure 2:
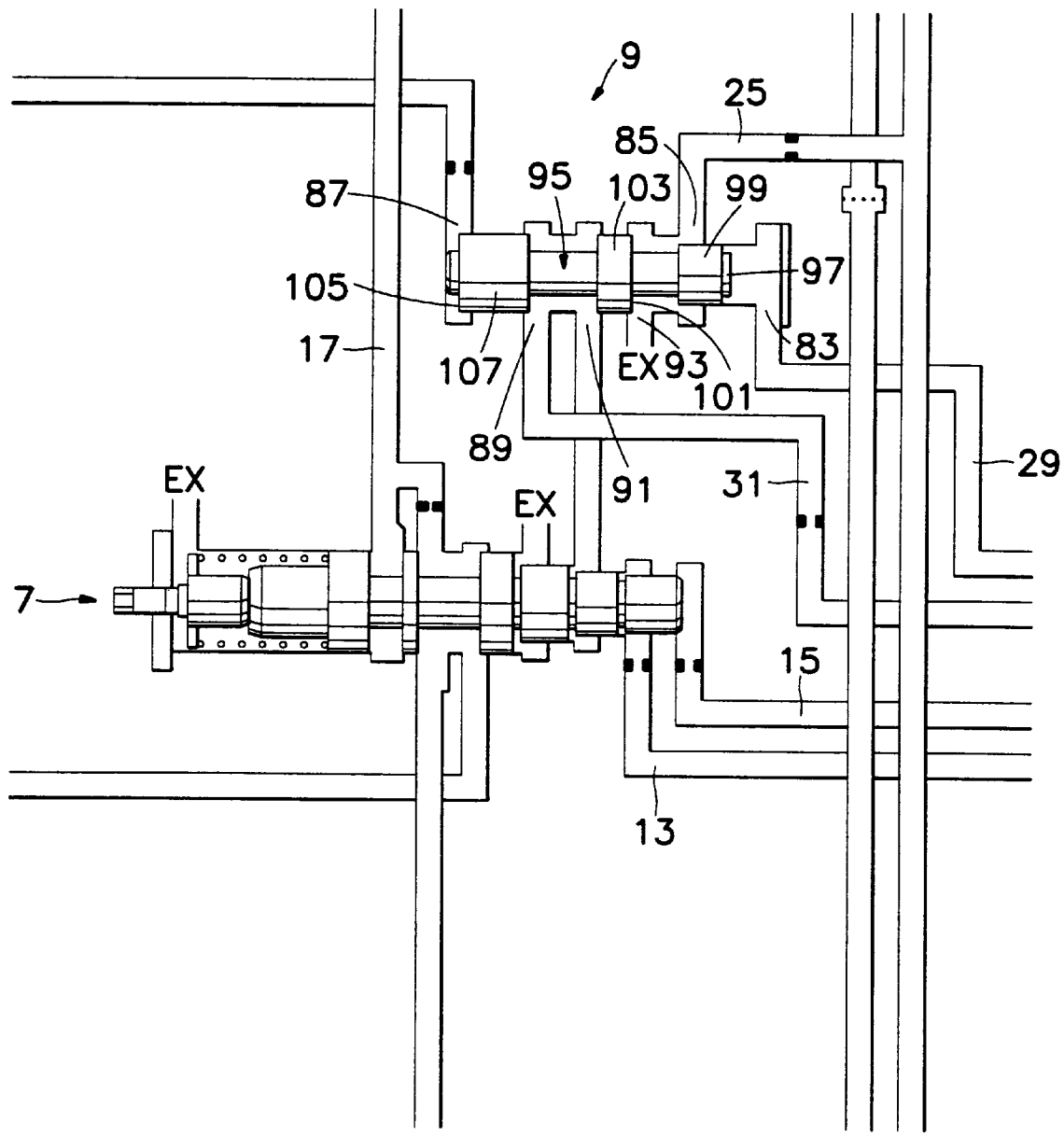
FIG. 2 is a detailed hydraulic circuit diagram of a line pressure control part depicted in FIG. 1.

As shown in FIG. 2, the high-low control valve 9 is provided with a first port 83 for receiving the third speed drive pressure, a second port 85 for receiving the reduced pressure, a third port 87 for receiving the control pressure, a fourth port 89 for receiving the second speed drive pressure, a fifth port 91 for directing the second speed drive pressure fed through the fourth port 89 to the regulator valve 7, and a sixth port 93 for selectively exhausting the second speed drive pressure fed through the fifth port 91 and the reduced pressure fed through the second port 85. Port conversion is achieved by a valve spool 95 which is displaced by each type of hydraulic pressure fed through the first, second and third ports 83, 85 and 87.

The valve spool 95 comprises a first land 99, on a right face 97 of which the third speed drive pressure fed through the first port 83 acts, and a second land 103 having a right face 101 which has a larger diameter than that of the first land 99 and on which reduced pressure coming through the second port 85 acts. The first and second lands 99 and 103 selectively connect the second and sixth ports 85 and 93.

The valve spool 95 further comprises a third land 107 having a face 105 which has the same diameter as the second land 103. The control pressure fed through the third port 87 acts on the face 105 of the third land 107 against the hydraulic pressure acting on the faces 97 and 101 of the respective first and second lands 99 and 103. The third land 107 selectively connects the fourth port 89 to the fifth port 91.

In the above described hydraulic control system, when the shift selector lever (not shown) is shifted to the drive "D" range, the manual valve 11 is controlled such that the line pressure passage 5 communicates with the forward pressure passage 15 and the passages 39 and 41.

Hydraulic pressure fed to the forward pressure passage 15 is used for regulating line pressure by being fed to the regulator valve 7, while hydraulic pressure fed to the passages 39 and 41 is directed, respectively, to the shift control valve 27 and the first and second pressure control valves 35 and 37.

In a first speed stage of the drive "D" range, the TCU controls the first and second shift control solenoid valve S3 and S4 to ON states, the first pressure control solenoid valve S1 to an ON state, and the second pressure control solenoid valve S2 to an OFF state, thereby realizing the first speed stage.

[Second Speed Stage of Drive "D" Range Where the Damper Clutch Is Operated]

As vehicle speed and throttle opening increase in the first speed stage, the TCU controls the first shift solenoid valve S3 to an OFF state, the second shift control solenoid valve S4 to an ON state, and the first and second pressure control solenoid valves S1 and S2 to OFF states, thereby directing second speed drive pressure from the shift control valve 27 to the second speed passage 45. This is shown in FIG. 1.

The drive pressure directed to the second speed passage 45 controls the 1-2 shift valve 51 so that the passage 69 can be connected to the first pressure control valve 35, thereby feeding operating pressure to the second friction member 61.

At this point, since the first and second pressure control solenoid valves S1 and S2 are both controlled to OFF states, reduced pressure fed from the reducing valve 9 through the passage 25 controls the first pressure control valve 37 such that the passage 41 connected to the manual valve 11 can be connected to the 1-2 shift valve 51 via the first pressure control valve 35 and, to the 2-4/3-4 shift valve 55 via the second pressure control valve 37.

Therefore, drive pressure is fed from the manual valve 11 to the first friction member 59 via the second pressure control valve 37 and the 2-4/3-4 shift valve 55, thereby operating the first friction member 59. At the same time, the drive pressure is also fed from manual valve 11 to the second friction member 61 via the first pressure control valve 35 and the 1-2 shift valve 51, thereby operating the second friction member 61 and completing shifting into the second speed stage.

The second speed stage where the first and second friction members 59 and 61 are operated can be divided into two states. One is a state where the damper clutch D of the torque converter 1 is operated and the other is a state where the damper clutch D in not operated. FIG. 1 shows the state where the damper clutch D is operated.

In this state, since the damper clutch solenoid valve S is controlled to an ON state by the TCU, hydraulic pressure passing through the torque converter control valve 19 is directed to a damper clutch operating side of the torque converter 1 via the damper clutch control valve 21, thereby operating the damper clutch D.

That is, since the damper clutch control solenoid valve S is controlled to an ON state by the TCU, control pressure of the solenoid valve S cannot be directed to the high-low control valve 9 through the third port 87. However, the reduced pressure fed from the reducing valve 23 is directed to the high-low control valve 9 through the second port 85 and acts on the right face 101 of the second land 101 of the valve spool 95, displacing the valve 95 towards the left to communicate the fourth and fifth ports 89 and 91.

As a result, the second drive pressure fed to the high-low valve 9 through the fourth port 89 is directed to the regulator valve 7 through the fifth port 91.

The second drive pressure directed to the regulator valve 7 controls the regulator valve 7 with forward pressure fed from the forward pressure passage 13 to the regulator valve 7 such that the amount of fluid returned to the hydraulic pump 3 through the regulator valve 7 can be increased, thereby controlling the line pressure to a low state. At this point, the reduced pressure fed to the high-low valve 9 through the second port 85 is exhausted through the sixth port 93.

[Third Speed Stage of Drive "D" Range]

Figure 3:
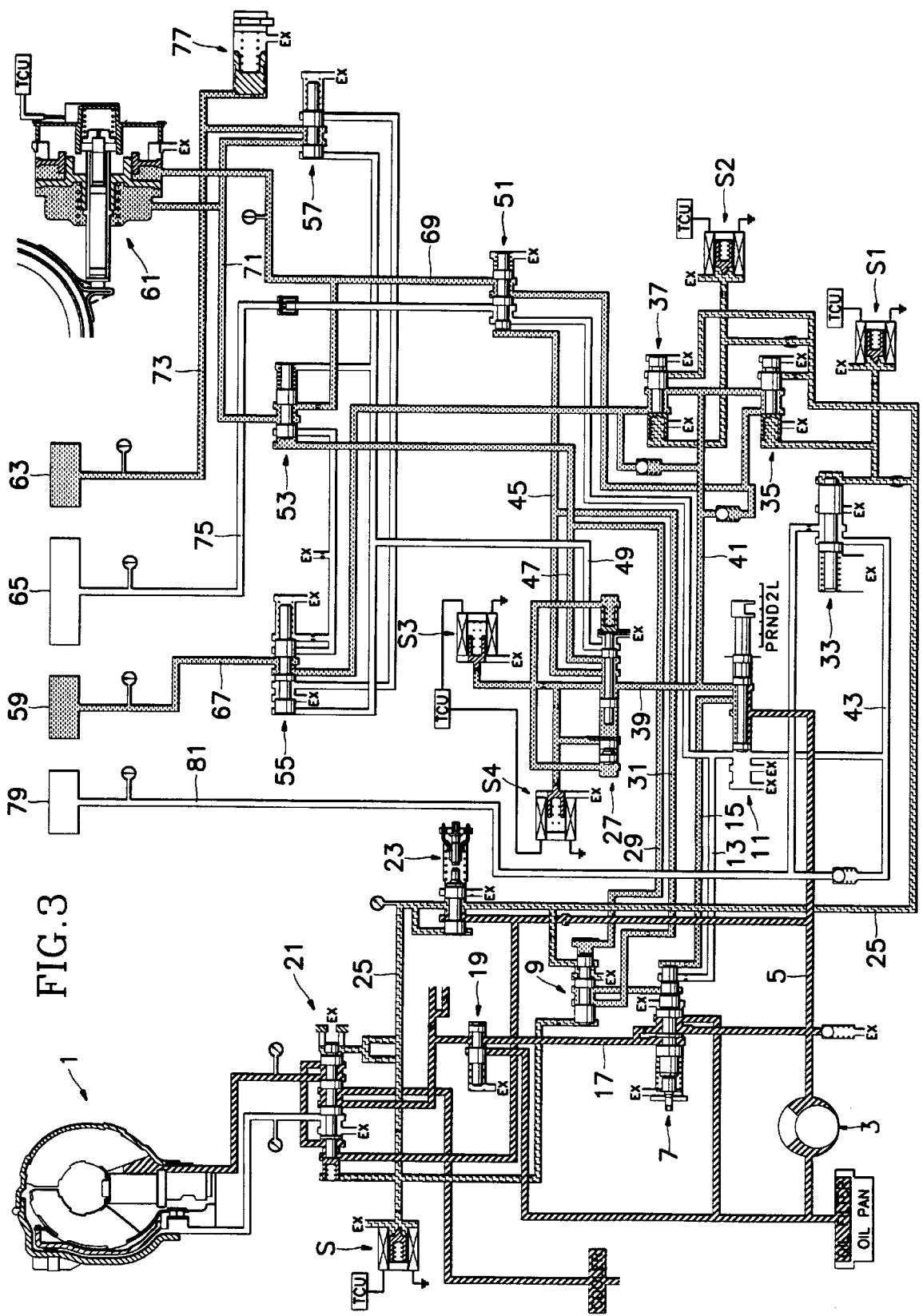
FIG. 3 is a hydraulic circuit diagram showing hydraulic pressure flow when a hydraulic control system according to a preferred embodiment of the present invention is in a third speed stage where a damper clutch is operated.
Figure 4:
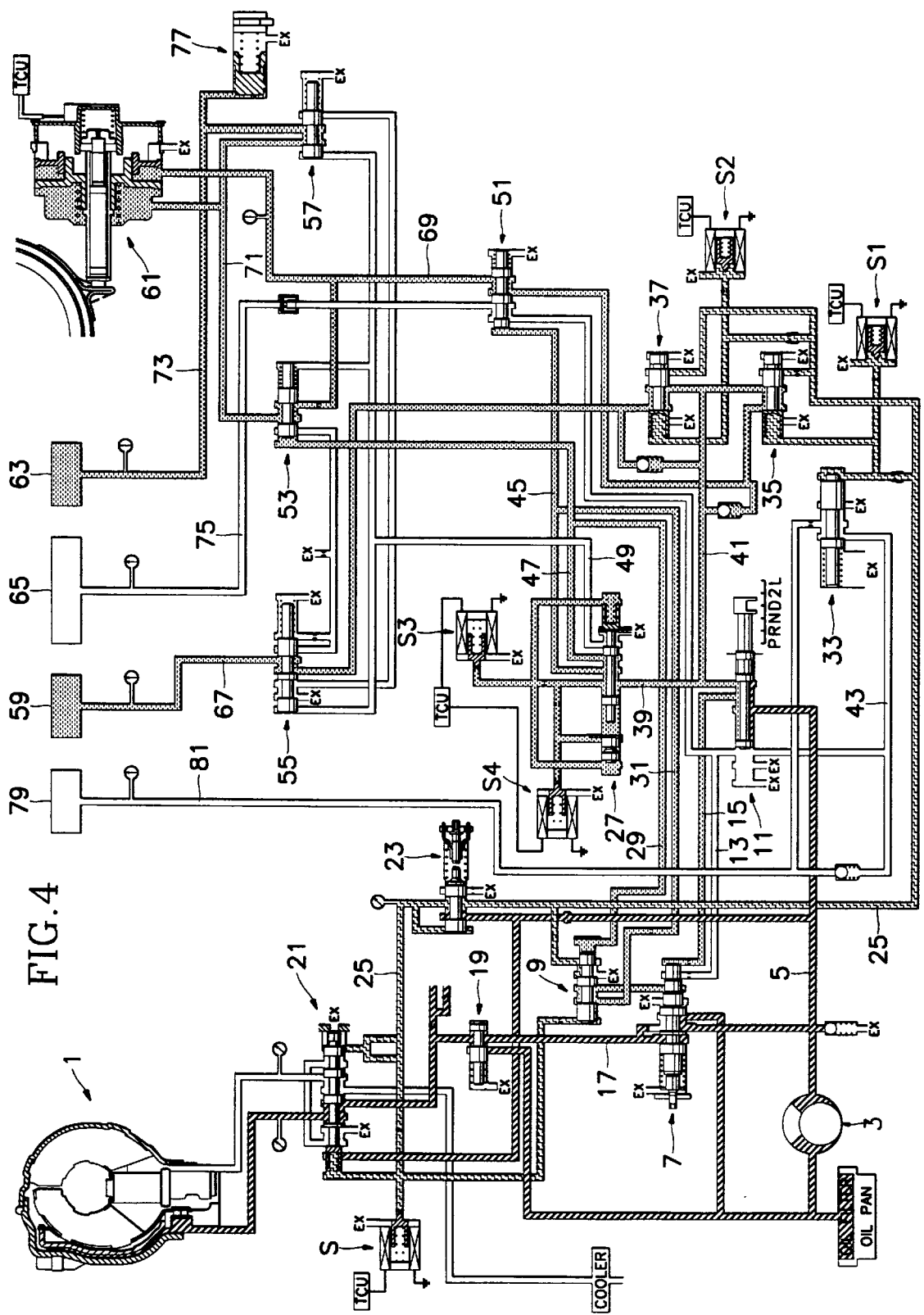
FIG. 4 is a hydraulic circuit diagram showing hydraulic pressure flow when a hydraulic control system according to a preferred embodiment of the present invention is in a third speed stage where the damper clutch is not operated.

As vehicle speed and throttle opening further increase in the second speed state, the TCU controls the first and second shift control solenoid valves S3 and S4 to OFF states as shown in FIGS. 3 and 4, such that second and third speed drive pressures are respectively directed from the shift control valve 27 to the second and third speed passages 45 and 47.

The second speed drive pressure directed to the second speed passage 45 controls the 1-2 shift valve 51 as in the second speed state, and the third speed drive pressure directed to the third speed passage 47 controls the 2-3/4-3 shift valve 53 such that the 1-2 shift valve 51 can communicate with the passage 71, thereby feeding release pressure to the second friction member 61.

In addition, since the first and second pressure control solenoid valves S1 and S2 are controlled to OFF states as in the second speed stage, the first and second pressure control valves 35 and 37 are controlled as in the second speed stage.

Therefore, the first friction member 59 maintains its operating state by drive pressure fed from the manual valve 11 via the 2-4/3-4 shift valve 55 and, at the same time, the drive pressure is directed to the first pressure control valve 35 and the 1-2 shift valve 51. The drive pressure directed to the 1-2 shift valve 51 is fed to the second friction member 61 via the 2-3/4-3 shift valve 53 as release pressure to release the second friction member 61. Part of the drive pressure directed to the 2-3/4-3 shift valve 53 is fed to the third friction member 63 via the end clutch valve 57 to operate the same.

At this point, the third speed drive pressure is fed to the first port 83 of the high-low control valve 9 through the passage 29 connected to the third passage 47, and the second speed drive pressure is fed to the fourth port 89 of the high-low control valve 9 through the passage 31 connected to the second speed passage 45.

As described above, the third speed state where the first and third friction members 59 and 63 are applied can be divided into two states, one is a state where the damper clutch D is operated, and the other is a state where the damper clutch D is not operated.

[Third Speed Where Damper Clutch Is Operated]

FIG. 3 shows the third speed state where the damper clutch D is operated. In this state, since the damper clutch solenoid valve S is controlled to an ON state, hydraulic pressure passing through the torque converter control valve 19 is applied to the torque converter 1 as operating pressure via the damper clutch control valve 21. At this point, since the control pressure of the damper clutch solenoid valve S cannot be directed to the third port 87 of the high-low control valve 9 and does not act on the face 105 of the third land 107. However, the third speed drive pressure directed from the third speed passage 47 to the first port 83 of the high-low control valve 9 acts on the face 97 of the first land 99 of the high-low control valve 9, and the reduced pressure coming through the second port 85 acts on the face 101 of the second land 103, thereby displacing the valve spool 95 towards the left to communicate the fourth and fifth ports 89 and 91.

As a result, the second speed drive pressure coming through the fourth port 98 is directed to the regulator valve 7 through the fifth port 91. The second speed drive pressure directed to the regulator valve 7 controls the regulator valve 7 with forward pressure fed from the forward pressure passage 13 to the regulator valve 7 such that the amount of fluid returned to the hydraulic pump 3 through the regulator valve 7 can be increased, thereby controlling the line pressure to a low state. At this point, the reduced pressure fed to the high-low valve 9 through the second port 85 is exhausted through the sixth port 93.

[Third Speed Where Damper Clutch Is Not Operated]

FIG. 4 shows the third speed state where the damper clutch is not operated.

In this state, since the damper clutch solenoid valve S is controlled to an OFF state, hydraulic pressure passing through the toque converter control valve 19 is directed to the torque converter 1 via the damper clutch control valve 21 as release pressure of the damper clutch, thereby releasing the damper clutch.

As described above, since the damper clutch solenoid valve S is controlled to the OFF state, the control pressure of the damper clutch control valve S is fed to the high-low control valve 9 through the third port 87 and acts on the face 105 of the third land 107. However, since force generated by both the third drive pressure acting on the face 97 of the first land 99 and the reduced pressure acting on the face 101 of the second land 103 is higher than that generated by the hydraulic pressure acting on the third land 107, the valve spool 95 is displaced towards the left and communicating the fourth and fifth ports 89 and 91.

As a result, the second speed drive pressure coming through the fourth port 89 is directed to the regulator valve 7 through the fifth port 91. The second speed drive pressure directed to the regulator valve 7 controls the regulator valve 7 with forward pressure fed from the forward pressure passage 15 to the regulator valve 7 such that the amount of fluid returned to the hydraulic pump 3 through the regulator valve 7 can be increased, thereby controlling the line pressure to a low state. At this point, the reduced pressure fed to the high-low valve 9 through the second port 85 is exhausted through the sixth port 93.

[Fourth Speed of Drive "D" Range]

As vehicle speed and throttle opening further increase in the second speed state, the TCU starts to control the first and second shift control solenoid valves S3 and S4 to OFF states as shown in FIGS. 3 and 4, such that second and third speed drive pressures are respectively directed from the shift control valve 27 to the second and third speed passages 45 and 47.

The second and third speed drive pressures directed to the second and third speed passages 45 and 47 control the 1-2 shift valve 51 and 2-3/4-3 shift valve 53 as in the third speed state.

In addition, fourth speed drive pressure directed to the fourth speed passage 49 controls the 2-4/3-4 shift valve 55 such that this valve 55 disconnects the passage 67 for feeding hydraulic pressure to the first friction member 59 with the second pressure control valve 37, thereby interrupting hydraulic pressure directed to the first friction member 59, and such that the second pressure control valve 37 is connected to the end clutch valve 57.

Meanwhile, as in the third speed state, since the first and second pressure control solenoid valves S1 and S2 are controlled to OFF states, the reduced pressure from the reducing valve 9 controls the first and second control valves 35 and 37.

Therefore, part of the drive pressure is fed from the manual valve 11 to the third friction member 63 via the second pressure control valve 37, the 2-4/3-4 shift valve 55, and the end clutch valve 57, and part of the drive pressure is fed as operating pressure to the second friction member 61 via the first pressure control valve 35 and the 1-2 shift valve 51, thereby operating the second friction member 61 and realizing shifting into the fourth speed stage. At this point, the release pressure of the second friction member 61 is exhausted.

Further, part of the third speed drive pressure flowing along the passage 47 connecting the shift control valve 27 to the 2-3/4-3 shift valve 53 is fed to the first port 83 of the high-low control valve 9 along the passage 29, and part of the second drive pressure flowing along the passage 45 connecting the shift control valve 27 to the 1-2 shift valve 51 is fed to the fourth port 89 of the high-low control valve 9 along the passage 31.

As described above, the fourth speed stage where the second and third friction members 61 and 63 are operated can also be divided into the damper clutch operating state and the damper clutch non-operating state.

[Fourth Speed Where Damper Clutch Is Operated]

Figure 5:
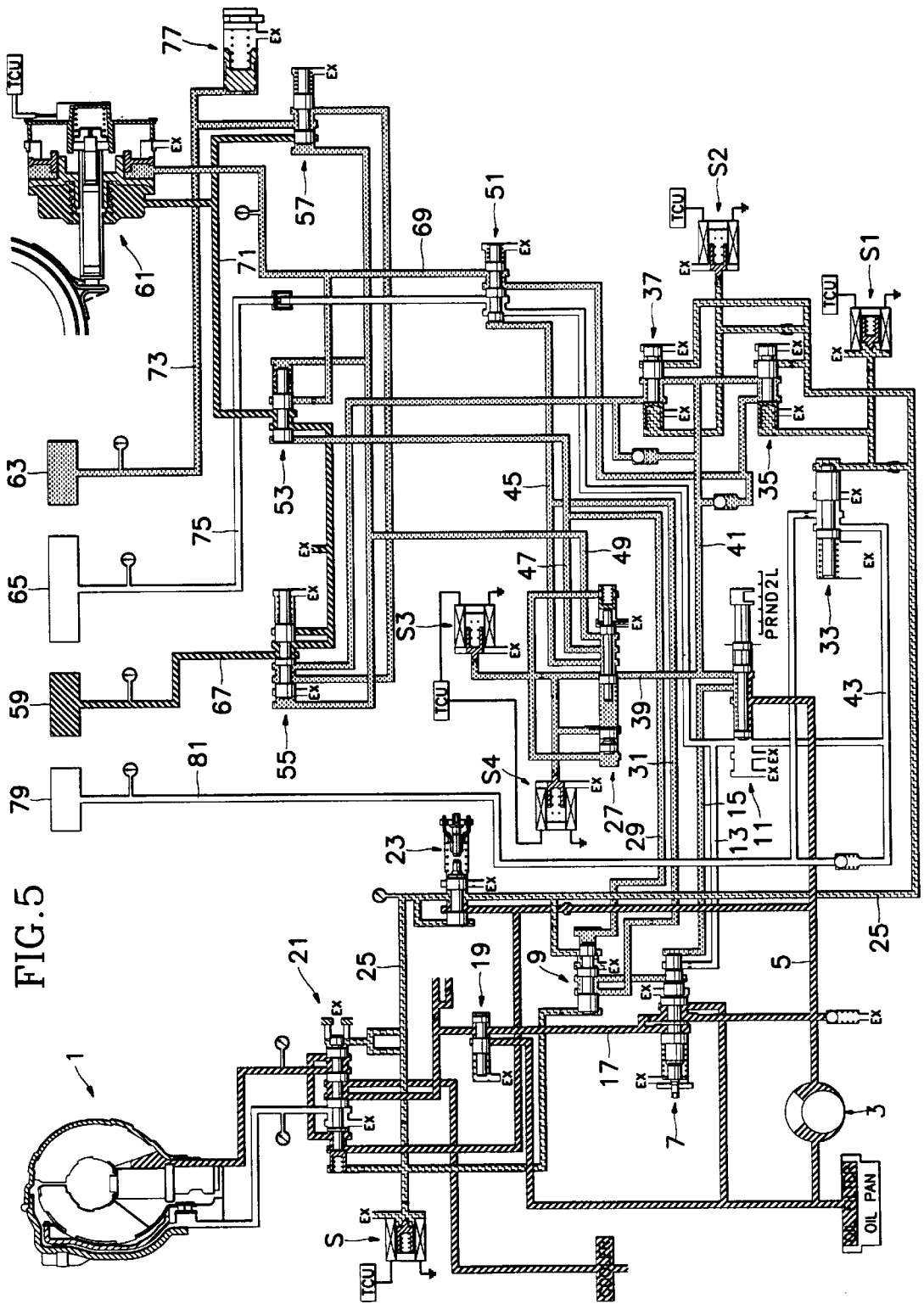
FIG. 5 is a hydraulic circuit diagram showing hydraulic pressure flow when a hydraulic control system according to a preferred embodiment of the present invention is in a fourth speed stage where the damper clutch is operated.

FIG. 5 shows the damper clutch operating fourth speed state. In this state, since the damper clutch solenoid valve S is controlled to an ON state, hydraulic pressure passing through the torque converter control valve 19 is applied to the torque converter 1 as operating pressure via the damper clutch control valve 21. At this point, since the control pressure of the damper clutch solenoid valve S cannot be directed to the third port 87 of the high-low control valve 9 and does not act on the face 105 of the third land 107. However, the third speed drive pressure directed from the third speed passage 47 to the first port 83 of the high-low control valve 9 acts on the face 97 of the first land 99 of the high-low control valve 9, and the reduced pressure coming through the second port 85 acts on the face 101 of the second land 103, thereby displacing the valve spool 95 towards the left and communicating the fourth and fifth ports 89 and 91.

As a result, the second speed drive pressure coming thorough the fourth port 98 is directed to the regulator valve 7 through the fifth port 91. The second speed drive pressure directed to the regulator valve 7 controls the regulator valve 7 with forward pressure fed from the forward pressure passage 15 to the regulator valve 7 such that the amount of fluid returned to the hydraulic pump 3 through the regulator valve 7 can be increased, thereby controlling the line pressure to a low state. At this point, the reduced pressure fed to the high-low valve 9 through the second port 85 is exhausted through the sixth port 93.

[Fourth Speed Where Damper Clutch Is Not Operated]

Figure 6:
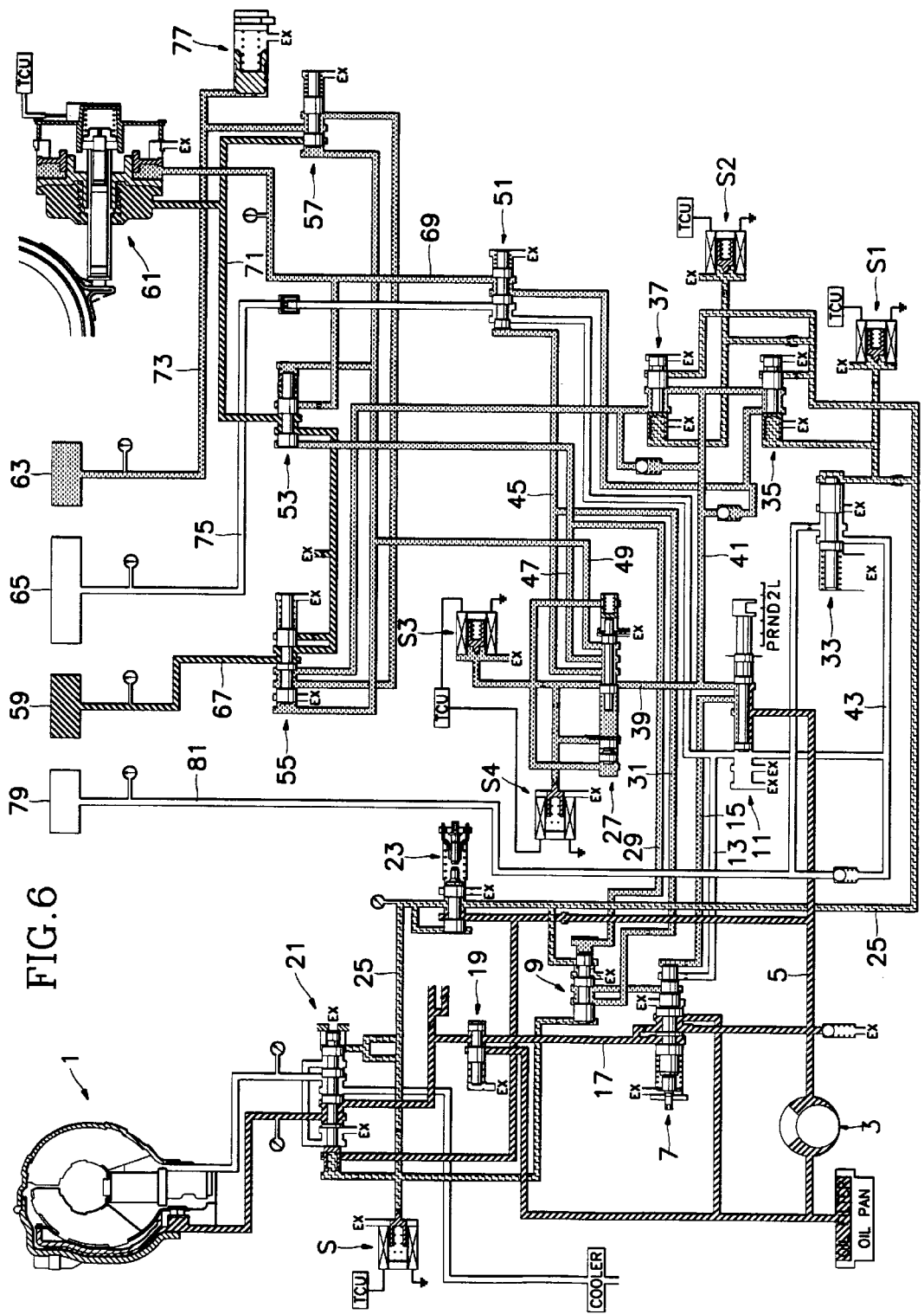
FIG. 6 is a hydraulic circuit diagram showing hydraulic pressure flow when a hydraulic control system according to a preferred embodiment of the present invention is in a fourth speed stage where the damper clutch is not operated.

FIG. 6 shows the fourth speed state where the damper clutch is not operated.

In this state, since the damper clutch solenoid valve S is controlled to an OFF state, hydraulic pressure passing through the toque converter control valve 19 is directed to the torque converter 1 via the damper clutch control valve 21 as release pressure of the damper clutch, thereby releasing the damper clutch.

As described above, since the damper clutch solenoid valve S is controlled to the OFF state, the control pressure of the valve S is fed to the high-low control valve 9 through the third port 87 and acts on the face 105 of the third land 107. However, since force generated by both the third drive pressure acting on the face 97 of the first land 99 and the reduced pressure acting on the face 101 of the second land 103 is higher than that generated by the hydraulic pressure acting on the third land 107, the valve spool 95 is displaced towards the left to communicate the fourth and fifth ports 89 and 91.

As a result, the second speed drive pressure coming through the fourth port 98 is directed to the regulator valve 7 through the fifth port 91. The second speed drive pressure directed to the regulator valve 7 controls the regulator valve 7 with forward pressure fed from the forward pressure passage 13 to the regulator valve 7 such that the amount of fluid returned to the hydraulic pump 3 through the regulator valve 7 can be increased, thereby controlling the line pressure to a low state. At this point, the reduced pressure fed to the high-low valve 9 through the second port 85 is exhausted through the sixth port 93.

As described above, the line pressure is controlled to a low state in the third and fourth speed states regardless of whether the damper clutch is operating or not, improving shift efficiency.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A hydraulic control system for an automatic transmission including a plurality of friction elements associated with respective transmission speeds, the hydraulic control system comprising:

a hydraulic pressure source;

line pressure control means for controlling hydraulic pressure from the hydraulic pressure source to constant line pressure;

reducing pressure control means for generating reduced pressure by reducing hydraulic pressure from the hydraulic pressure source;

damper clutch control means for supplying hydraulic pressure fed from the line pressure control means to a torque converter as damper clutch release or operating pressure by controlling reduced pressure from reducing pressure control means;

shift control means for converting hydraulic pressure from the line pressure control means into drive pressure corresponding to each speed stage;

hydraulic control means for controlling drive pressure from the shift control means by controlling reduced pressure from the reducing control means; and pressure distributing means for distributing hydraulic pressure from the hydraulic control means to each friction member for each speed stage by being controlled by drive pressure from the shift control means;

wherein the line pressure control means comprises:

a regulator valve controlling hydraulic pressure from the hydraulic pressure source to line pressure; and a high-low control valve controlled by reduced pressure from the reducing control means, control pressure from the damper clutch control means, and third speed drive pressure from the shift control means, and supplying second speed drive pressure from the shift control means to the regulator valve, thereby controlling an operation of the regulator valve together with forward/reverse drive pressure fed from the shift control means to the regulator valve.

2. The hydraulic control system according to claim 1 wherein the high-low control valve comprises:

a first port for receiving the third speed drive pressure from the shift control means;

a second port for receiving the reduced pressure from the reducing control means;

a third port for receiving the control pressure from the damper clutch control means;

a fourth port for receiving the second speed drive pressure from the shift control means;

a fifth port for supplying the second speed drive pressure coming through the fourth port to the regulator valve; and a valve spool for controlling port conversion in accordance with hydraulic pressure fed through the first, second and third ports.

3. The hydraulic control system according to claim 2 wherein the valve spool comprises:

a first land on which the third speed drive pressure coming through the first port acts;

a second land on which the reduced pressure coming through the second port acts so as to function together with the first land for selectively communicating the second port with the sixth port, the second land having a diameter larger than that of the first land; and a third land on which the control pressure coming through the third port acts for selectively communicating the fourth port with the fifth port and for selectively communicating the fifth port with the sixth port together with the second land.

4. The hydraulic control system according to claim 3, wherein the damper clutch control means comprises a damper clutch control solenoid valve, the damper clutch control solenoid valve being controlled in a second speed stage such that the control pressure cannot be applied to the high-low control valve, the reduced pressure can be applied to the high-low pressure valve, and the second speed drive pressure can be fed to the regulator valve via the high-low control valve, whereby the regulator valve is controlled by the second speed drive pressure and the forward drive pressure from the manual valve so as to control the line pressure to a low state.

5. The hydraulic control system according to claim 3, wherein the damper clutch control means comprises a damper clutch control solenoid valve, and the high-low control valve is constantly controlled by the reduced pressure and the third speed drive pressure in third and fourth speed stages regardless of whether the damper clutch solenoid valve is being controlled to On or Off state such that the second speed drive pressure can be fed to the regulator valve via the high-low control valve, whereby the regulator valve is controlled by the second speed drive pressure and the forward drive pressure from the manual valve so as to control the line pressure to a low state.

* * * * *